(12) United States Patent
Van Den Enden et al.

(10) Patent No.: US 6,580,680 B1
(45) Date of Patent: Jun. 17, 2003

(54) OPTICAL DISC AND APPARATUS FOR SCANNING THE OPTICAL DISC

(75) Inventors: Gijsbert J. Van Den Enden, Veldhoven (NL); Johannes H. M. Spruit, Eindhoven (NL); Johannus L. Bakx, Eindhoven (NL); Shoei Kobayashi, Shinagawa-Ku (JP); Masayuki Arai, Shinagawa-Ku (JP); Yoshiyuki Akiyama, Shinagawa-Ku (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,694

(22) Filed: Aug. 4, 1999

(30) Foreign Application Priority Data

Aug. 4, 1998 (EP) .............................. 98202625

(51) Int. Cl.⁷ ................................. G11B 7/00
(52) U.S. Cl. ............... 369/275.3; 369/47.28; 369/53.2; 369/59.1
(58) Field of Search ............ 369/44.13, 44.26, 369/32, 47.1, 47.28, 44.31, 53.1, 53.11, 53.2, 53.28, 53.34, 53.41, 59.1, 59.25, 275.1, 275.3, 275.4

(56) References Cited

U.S. PATENT DOCUMENTS 4,901,300 A 2/1990 Van Der Zande et al. .... 369/47
5,559,777 A * 9/1996 Maeda et al. ............. 369/47.5
6,147,961 A * 11/2000 Nagasawa et al. ....... 369/275.3

FOREIGN PATENT DOCUMENTS

| EP | 0587019 A2 | 3/1994 |
| EP | 0827139 A2 | 3/1998 |
| WO | WO9750083 | 12/1997 |

* cited by examiner

Primary Examiner—Muhammad Edun
(74) Attorney, Agent, or Firm—Michael E. Belk

(57) ABSTRACT

The invention relates to an optical disc for recording data at a constant density, so called CLV (Constant Linear Velocity) or at zoned CLV. The disc has headers distributed along the disc on regular angular positions, a so called CAV (Constant Angular Velocity) pattern subdividing the track in track portions for recording an amount of data proportional to the radical position of the track portion concerned. Address information included in the headers is provided at the data density, which is CLV. The apparatus comprises header detection means for detecting the headers at the CAV locations, and for recovering position information from the headers at CLV density. Data sectors do not start at headers and are not fitted regularly between the headers, but start and stop at arbitrary positions which are calculated from the known amounts of data recordable in the track portion.

19 Claims, 5 Drawing Sheets

OPTICAL DISC AND APPARATUS FOR SCANNING THE OPTICAL DISC

FIELD OF THE INVENTION

The invention relates to the field of optical disk data storage and retrieval.

BACKGROUND OF THE INVENTION

The invention relates to an optical disc including a recording area for recording data at a substantially constant density. The recording area includes circular or spiral tracks provided with a servopattern including headers alternating with track portions. The headers are radially aligned and include position information, and the track portions are arranged for storing an amount of data substantially proportional to the radial position of the track portion concerned.

The invention further relates to a recording device for recording data at a substantially constant density on an optical disc having a recording area including circular or spiral tracks provided with a servopattern with headers alternating with track portions. The headers are radially aligned and include position information, and the track portions are arranged for recording an amount of data substantially proportional to the radial position of the track portion concerned. The recording device also includes a recording head, recording control apparatus and positioning apparatus for positioning the recording head on a track at a position to be recorded, and the positioning apparatus includes header detecting apparatus for retrieving the position information from the headers.

The invention further relates to a reading device for reading data from an optical disc recorded at a substantially constant density. The optical disc having a recording area including circular or spiral tracks provided with a servopattern including headers alternating with track portions. The headers are radially aligned and include position information, and the track portions include an amount of data substantially proportional to the radial position of the track portion concerned. The reading device also includes a reading head, reading control apparatus and positioning apparatus for positioning the reading head on a track at a position to be read, and the positioning apparatus includes header detecting apparatus for retrieving the position information from the headers.

Such a record carrier and apparatus are known from European Patent Application EP 0 587 019, herein document D1. The document discloses a record carrier in the form of an optical disc having a recording area including a pattern of grooves on a substrate, constituting a servopattern of circular or spiral tracks. The recording tracks are subdivided in longitudinal direction into track portions alternating with headers. The headers include position information, e.g. an address area including pre-recorded address marks. The headers are made during manufacture, e.g. in the form of so-called pre-pits formed by embossing. The address marks represent position information for positioning a recording head on a desired track and are indicative for the address of the recording area following the address area. In a direction transverse to the tracks, i.e. radially, the headers are aligned. The disc includes one track address and a fixed number of radially aligned servo pits in each turn, constituting a so-called sampled servo pattern. The servo pattern including radially aligned elements is called a Constant Angular Velocity (CAV) servo pattern, and is to be scanned by a servo system having a phase locked loop (PLL) to generate a servo frequency locked to the rotation frequency of the disc. The address marks are dimensioned to be read clocked by the servo frequency. Also, a data phase locked loop is provided for generating a data clock that is locked to a speed of data read/write operations, which are performed at a substantially constant linear density. Each track portion is arranged for recording an amount of data substantially proportional to the radial position of the track portion concerned. Hence, the density is substantially constant across the whole recording area, which corresponds to the well-known constant linear velocity (CLV) system. When jumping to a new radial position, the rotation frequency setting point or the data clock setting point are adjusted to the new position, but the servo phase locked loop remains locked to the CAV servo pattern. Hence the addresses in the headers can always be read at the servo frequency. The recording apparatus includes an optical system for recording or reading information by generating a spot via a radiation beam on a track of the record carrier. The optical disc is rotated and the spot is positioned in radial direction on the centre of the track by servo apparatus for scanning the track. During scanning, the servo phase locked loop is locked to the rotation frequency of the disc for reading the CAV servo pattern. The data phase locked loop is locked to the CLV data speed. The known record carrier and apparatus have the problem, that for reliable operation a first phase locked loop must be locked to the CAV servo pattern, and a second phase locked loop must be locked to the CLV data density.

Those skilled in the art are also directed to U.S. Pat. No. 4,901,300 herein document D2.

The above references are hereby incorporated herein in whole by reference.

SUMMARY OF THE INVENTION

It is an object of the invention to provide an optical disc, a recording device, and a reading device arranged for a more reliable data recording and/or retrieval operation while data is recorded at a substantially constant density.

An optical disc according to the invention, has position information the is provided substantially at the constant density. Thus, the headers are positioned on locations corresponding to a CAV pattern, but have an information content readable by the data clock. There is no need for a second phase locked loop, only one phase locked loop locked to the data frequency is required. Hence, the recording is less complex and more reliable. This is also advantageous in that, the space required for the header pattern is reduced when compared to a CLV header pattern, as shown, for example, in FIG. 2 and described below. Hence, the header overhead is reduced, which increases the effective data storage capacity of the disc.

A recording device according to the invention, has header detecting means arranged for reading the position information substantially at the constant density. A reading device according to the invention, has header detecting means arranged for reading the position information substantially at the constant density. Thus, the headers, although positioned corresponding to a CAV servo pattern, can be read by reading apparatus synchronized to the same data clock as used for data recorded in the track portion adjoining the header. This is advantageous in that, only one phase locked loop is required to generate the data clock locked to the data speed.

The invention is also based on the following recognition relating to the overhead and reduced data storage capacity incurred by applying headers. Headers in the servo pattern are used to indicate the location of data to be recorded, which data is usually subdivided into logical units called sectors. For example, document D1 describes a zoned disc having in each zone a fixed number of data sectors fitting in one turn of the track and one header per turn, the first sector starting at the one header. In our invention, several headers are required in one turn for fast access to the data after a jump to a new radial position, because otherwise, the device would have to wait maximally almost a full rotation of the disc before a header can be read. In known disc formats, such as DVD-RAM and shown in FIG. 2, a number of headers per turn is used in a CLV pattern, i.e. aligned with the sectors and therefore a radially outward increasing number of headers per turn of the track. A relative large header overhead is caused by the CLV header pattern. According to our invention, a number of headers in each turn being aligned radially in a CAV servo pattern allow fast recovery of the radial and angular position of the scanning unit. A high average density of data recording is achieved by recording in each track portion an amount of data proportional to the radial position of the track portion concerned causing CLV data density. In particular, the inventors have seen, that the disc format can be used for recording data blocks in logical sectors in the following way. The size of the logical sectors is selected independent of the distance between headers and the start of sectors is not necessarily at the headers. Contrary to the CAV system, the start of a sector is positioned at an arbitrary location relative to the beginning of the recording area, calculated from the known amounts of data in each preceding track portion. The headers are used only to determine the position of the scanning unit, and the start of a sector is located, for example, at m channel bits after header n. Hence, in the new disc format, headers may interrupt a sector at one or more arbitrary locations. However, as the headers are provided at the same density as the data of the sectors, they can be read by the data reading apparatus, recognized as being headers and eliminated from the recovered data. So the number of headers is relatively low and adjusted to the requirements of fast positioning. The low header overhead is advantageous for the total available storage capacity of the disc and therefore for the average density.

In an embodiment of the optical disc, the recording area is subdivided into a plurality of coaxial annular zones, each track portion within one of the zones for recording a same predetermined amount of data at a track portion density, the average of track portion densities within one zone being substantially equal to the constant density. This has the advantage, that the amount of data within each track portion within one of the zones is constant.

In a further embodiment of the optical disc, the track portions include periodic characteristics indicative of the density for the respective track portion. This has the advantage, that a data clock of the required frequency can be generated by a phase locked loop locked to the periodic characteristics. It is to be noted, that the periodic characteristics are available for recorded and unrecorded parts of the recorded area, whereby the headers can be read reliably also in unrecorded areas.

These and other aspects of the invention will be apparent from and elucidated further with reference to the embodiments described by way of example in the following description and with reference to the accompanying drawings

DETAILED DESCRIPTION OF THE PREFERRED EMBODIMENT

Figure 1A:
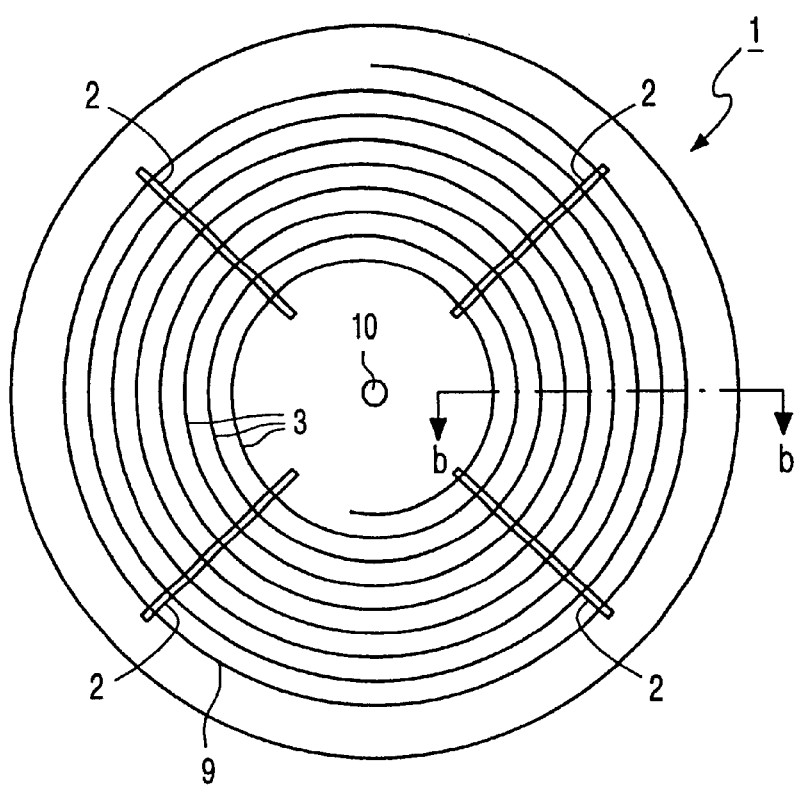
FIG. 1 shows a record carrier.

FIG. 1a shows a disc-shaped record carrier 1 having a track 9 intended for recording and a central hole 10. The track 9 is arranged in accordance with a pattern of turns constituting substantially parallel spiral tracks. The track 9 on the record carrier is indicated by a pre-embossed track structure provided during manufacture of the blank record carrier. The track structure includes, for example, a pregroove 4 which enables a read/write head to follow the track 9 during scanning. The invention is applicable in a corresponding manner to other track pattern having substantially parallel tracks, in which the turns are concentric instead of spiral forming circular tracks.

Figure 1B:
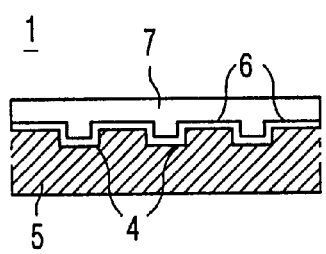

FIG. 1b is a cross-section taken along the line b—b of the record carrier 1, in which a transparent substrate 5 is provided with a recording layer 6 and a protective layer 7. The pregroove 4 may be implemented as an indentation or an elevation, or as a material property deviating from its surrounding. The recording layer 6 may be optionally or magneto-optically (MO) writable by a device for writing information, for example, as in the known CD-Recordable system. During writing, the recording layer is locally heated by a beam of electromagnetic radiation, such as laser light. The recording layer in a re-writable record carrier is contains, for example, a phase-change material which acquires an amorphous or crystallized state when it is heated to the correct extent.

Figure 1C:
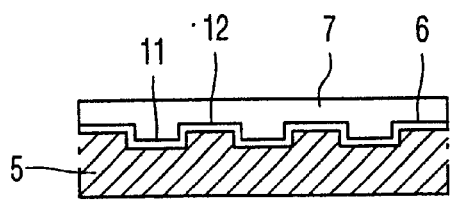

FIG. 1c shows an alternative track structure consisting of alternating elevated and deepened tracks, called lands 11 and grooves 12. It is to be noted, that both lands 11 and grooves 12 serve as recording tracks. Each turn has at least one area interrupting the lands and grooves constituting a header area. For a spiral pattern, the grooves may be continued as grooves once in each turn after the header area constituting a double spiral by the concatenated lands and the concatenated grooves. Alternatively, at least once per turn, a transition from land to groove or vice versa is established by switching to the other type after the header area.

According to the invention, the tracks are subdivided in recordable track portions 3 by radially aligned headers 2. The track portions 3 are for reading or recording optical marks representing user information, and are preceded by the headers for individually accessing each track portion. The headers include position information indicating the position of the header and the adjoining track portion relative to the beginning of the track or radial and angular parameters, e.g. address marks representing address information. Address marks on a recordable type of record carrier are usually embossed during manufacture to enable positioning of a read/write head anywhere on the still unrecorded record carrier. The headers are located at a few, e.g. four, angular positions in each turn of the track, which corresponds to the header locations used in the Constant Angular Velocity (CAV) system. However, the position information in the headers at the CAV locations is written at CLV density, i.e. the marks are encoding the position information at a constant density. This is schematically indicated by the rectangular header areas 2 in FIG. 1*a*. Due to the CAV location of the headers, the track portions have a length proportional to the radial position, i.e. the distance to the middle of the central hole 10. The track portions are recorded at a constant density, and therefore, the amount of data in a track portion is proportional to the radial position, called the CLV format. The data within the track portions and the position information in the adjoining header are recorded at the same density and can be read with the same reading apparatus. Data to be recorded is subdivided in sectors of a fixed length, which are recorded from a first arbitrary angular and radial position to a second arbitrary position, the positions being in between headers. In the disc format, according to the invention, there is no requirement to have a number of sectors fitting exactly in a turn, which gives additional advantages in average data density, because no zoning or small zones can be used. The arbitrary positions can be calculated according to a few formula's knowing the amounts of data recordable in each track portion. Hence, a reduced header overhead is achieved using a few CAV aligned headers per turn and writing sectors at CLV data density, which sectors are not aligned to the headers.

Figure 2:
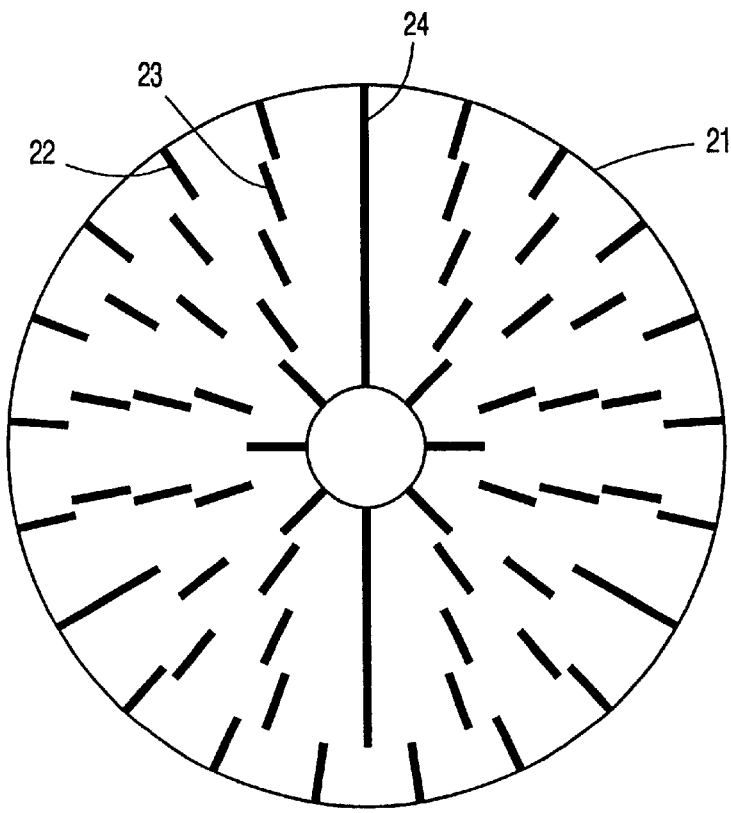
FIG. 2 shows a prior art optical disc with a CLV header pattern.

FIG. 2 shows a prior art optical disc 21, such as DVD-RAM, using a zoned CLV format (CLV=Constant Linear Velocity, i.e. constant recording density independent of the radial position). Headers 22,23,24 are provided for each sector, and the recording area of the disc is subdivided in coaxial annular zones. Each track portion within one of the zones, accommodates one sector, and the associated header includes a physical address for that sector. Each zone has a fixed number of sectors in a turn, and the number of zones increases by one for each radially outward next zone. The headers 24 of the first sector in each turn are aligned radially. The further headers 22,23 are aligned within the zone, and within the zone the amount of data recorded in a turn remains constant according to the CAV system (Constant Angular Velocity). The format of the disc is called ZCLV (Zoned CLV). However the prior art ZCLV disc has a significant loss of data storage capacity due to the large amount of headers. This loss is referred to as overhead, which overhead is reduced by the invention.

Figure 3:
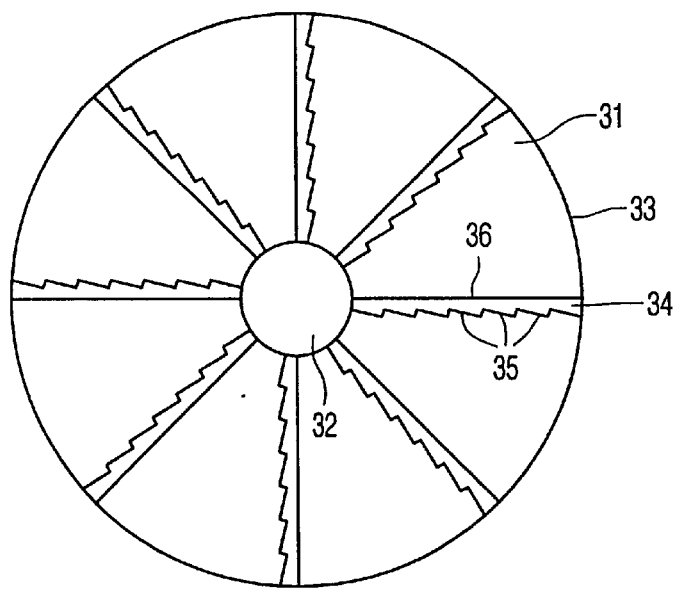
FIG. 3 shows a zoned optical disc.

FIG. 3 shows a zoned optical disc according to the invention. The disc has a recording area 31 from an inner diameter 32 to an outer diameter 33. The recording includes circular or spiral tracks (as shown in FIG. 1) and the tracks are interrupted by headers 34 forming track portions. The headers are radially aligned, in particular, the beginning of the headers is aligned along straight radial lines 36. The recording area 31 of the disc is subdivided in coaxial annular zones, and within each zone the track potions are arranged for recording a same amount of data. Within a zone, the density starts at a nominal level, say the CLV density, and decreases proportional to the radial portion of the track portion concerned, and at the beginning of a next zone the density is set to the nominal level. Hence, the density within each zone is according to the CAV system. The average density of the total recording area is a little below the nominal CLV level, such a zoning loss being dependent on the number of zones, e.g. larger with only a few large zones. Hence, each track portion within one of the zones is arranged for recording a same predetermined amount of data at a track portion density, and the average of track portion densities within one zone is substantially equal to the CLV density. The headers are written at the data density, which decreases outwardly within a zone according to the CAV system, the ending portions 35 of the headers are aligned at radial line-pieces 35 at a different angle constituting a sawtooth like structure on each spoke. In an embodiment of the disc, the track portions are provided with periodic characteristics indicative of the density for the respective track portion. During scanning in a reading device, the periodic characteristics generate a periodic signal in a scanning unit, e.g. in the servo signals or the data reading signal. The periodic signals can be used to synchronize the data recording or reading, e.g. by a phase locked loop circuit locked to the periodic signal. The periodic characteristics may be a variation of the track position in a direction transverse to the track called a wobble, or other variations of width or depth of the track. A track wobble for a CLV disc without headers, e.g. a CD□R, is described in U.S. Pat. No. 4,901,300, document (D2). In an embodiment of the zoned disc, according to the invention, the track wobbles within a zone are radially aligned. The number of wobbles within a track portion is constant, and a fixed amount of data corresponds to one wobble, e.g. one wobble is 324 channel bits, and a frame is 6 wobbles or 1994 channel bits or 155 data bytes for a given channel code.

Figure 4A:
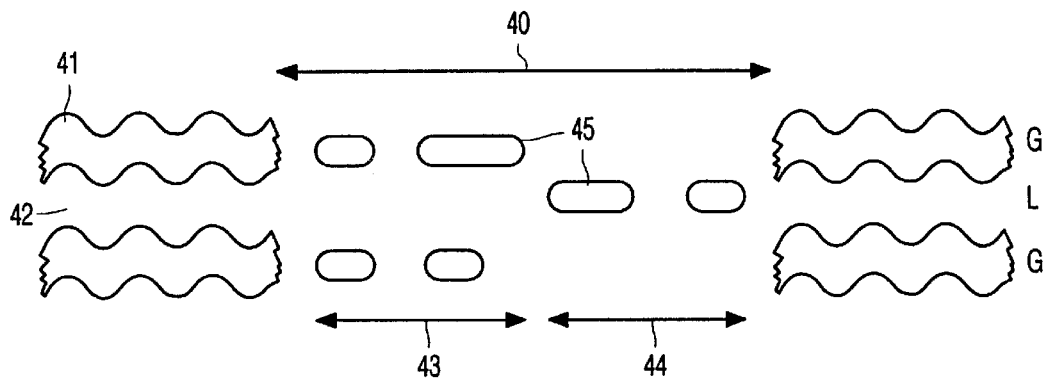
FIG. 4 shows a header and sector layout.

FIG. 4 shows a header and sector layout. FIG. 4*a* shows a land/groove pattern interrupted by headers in an enlarged and schematic way. A first groove 41 is interrupted by a header area 40. A first land 42 radially adjoins the first groove 41, and further grooves and lands follow. The grooves are provided with a transversal variation of the location, the so-called wobble, which is aligned between grooves. The header area is subdivided in a first portion 43 used for groove headers and a second portion 44 for land headers. Hence the reading of address marks 45 representing the position information is not disturbed by interference from address marks in a radially neighbouring area.

Figure 4B:
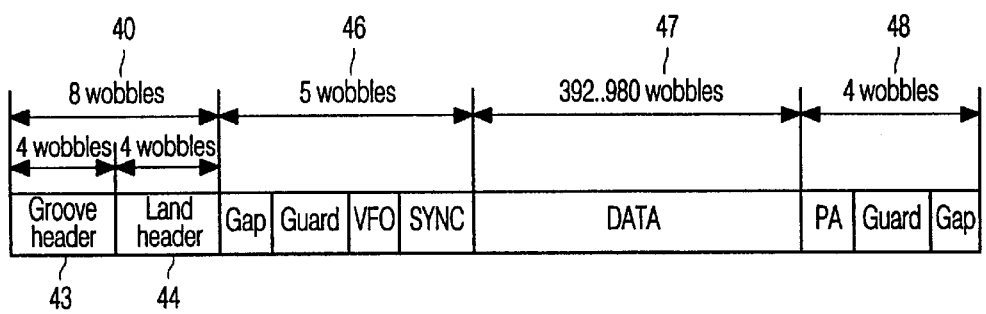

FIG. 4*b* shows a header and track portion layout indicating the logical assignment of information stored. The unit of length is the wobble period, which corresponds to a fixed amount of channel bits as explained above. First a header are 40 is given, subdivided in a groove header portion 43 and a land header portion 44. Thereafter a 5 wobble control portion 46 follows for controlling the reading of stored data. The control portion 46 is subdivided in a Gap (non written area directly adjoining the header area), a Guard area for starting the writing operation (some variation in the starting point allowed to prevent wear), a VFO area for locking a Variable Frequency Oscillator, and a SYNC pattern for logically synchronising the channel code. After the control portion 46, a DATA area 47 follows for storing the user data, which DATA area has a length depending on the radial portion of the track portion. The last part 48 of the track portion, before the next header area, is subdivided in a PA, a Post Amble for closing the channel code encoding, a second Guard and Gap with similar function as Gap and Guard in the control portion 46.

Figure 4C:
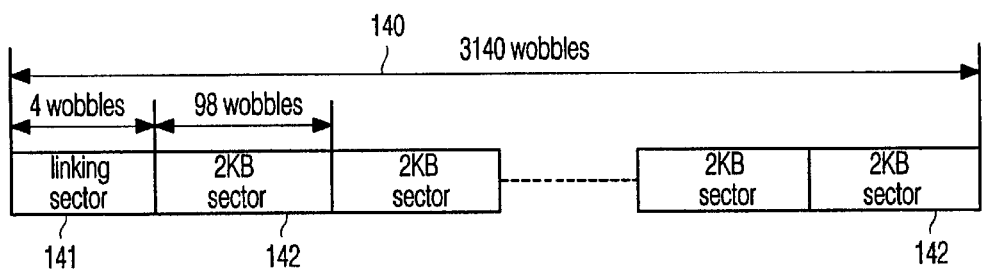

FIG. 4*c* shows the logical data format. User data is subdivided in sectors 142 of a fixed length of 2 kByte, which each, for example, require 98 wobbles when recorded. A number of sectors, e.g. 32, are joined together forming an ECC block, in which Error Correcting Codes are included for correcting errors anywhere in the ECC block. Such a long ECC block provides better protection against burst errors, and constitutes the minimum amount of data to be written. Also, if only one sector must be changed, the full ECC block is to be written including newly calculated error codes. A linking sector 141, which is only a few wobbles, is reserve as buffer in between ECC blocks to allow independent writing of such blocks. Usually, the linking sector is written with dummy data to make sure that no intermediate blank areas remain. Obviously, the ECC block does not fit in a track portion, the block may be larger or smaller then the DATA area 47 within a track portion. The actual start of an ECC block can be easily calculated from the length of the block, the block address and the size of the track portions, which varies in a predetermined way depending on the radial position. The calculation gives a track number, a header number within the track, and a distance from that header, e.g. expressed as a number of wobbles. In an embodiment of the optical disc, the position information in the header includes a track number indicating the radial position of the track and header number indicating the angular position of the header. It is to be noted, that a specific header will always be within a block with a specific address and there will always by located a next block at a known distance from that header. In an embodiment of the optical disc, the position information in a header includes a block address indicating the block locatable at the header and a next block indicator indicative of the distance from the header to the start of the next block. The block address may be the block starting before and including the header, or it may be the address of the next starting block.

Figure 5:
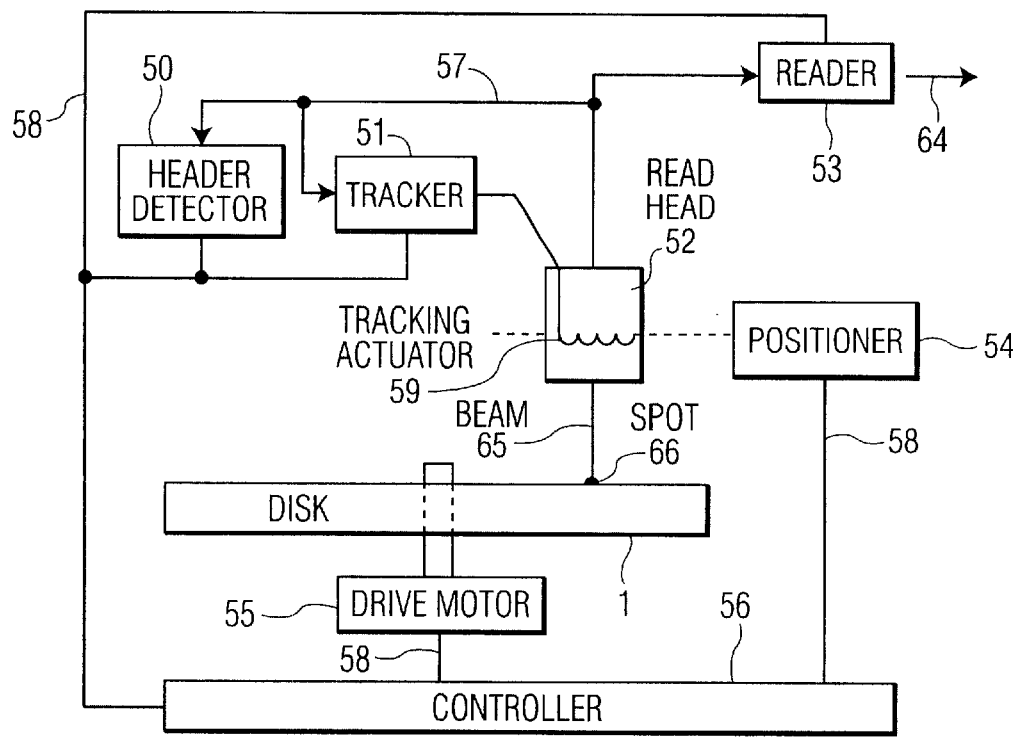
FIG. 5 shows an apparatus for reading a record carrier.
Figure 6:
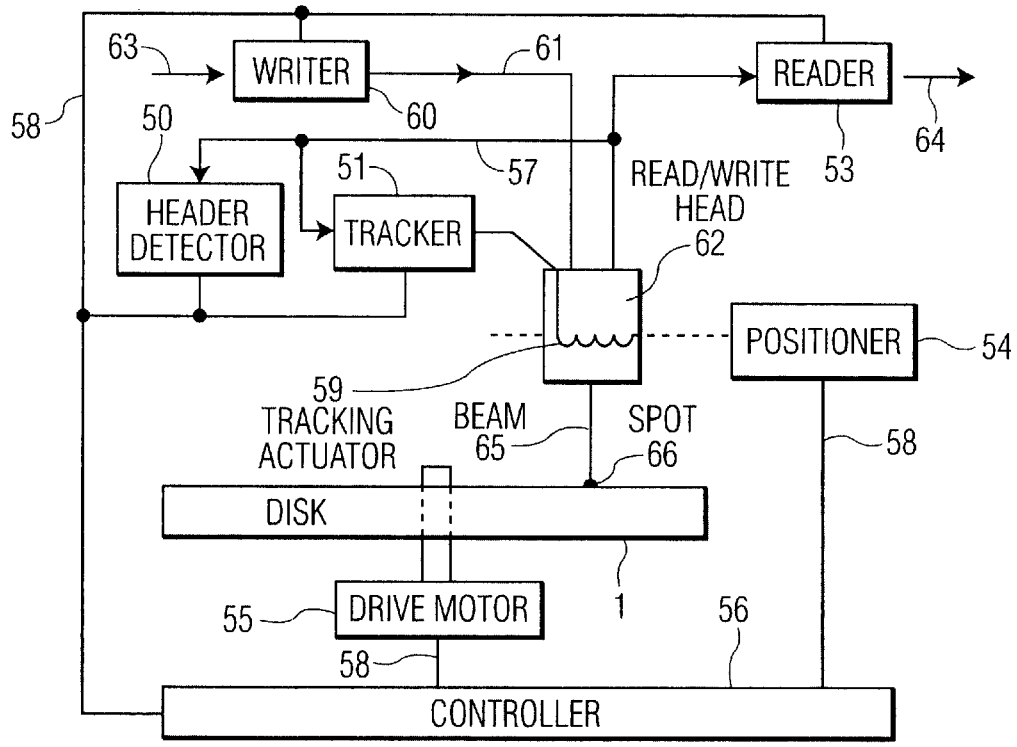
FIG. 6 shows an apparatus for writing and reading a record carrier.

FIGS. 5 and 6 show reading apparatus according to the invention for scanning a record carrier 1. The scanning apparatus of FIG. 5 are arranged for reading the record carrier 1, which record carrier is identical to the record carriers shown in FIG. 1 or FIG. 3. The device is provided with drive apparatus 55 for rotating the record carrier 1, and a read head 52 for scanning the track on the record carrier. The read head includes an optical system of a known type for generating a radiation spot 66 focused on a track of the recording layer of the record carrier via a radiation beam 65 guided through optical elements. The radiation beam 65 is generated by a radiation source, e.g. a laser diode. The read head further includes a focusing actuator for focusing the radiation beam 65 on the recording layer and a tracking actuator 59 for fine positioning of the spot 66 in radial direction on the centre of the track. The tracking actuator 59 may includes coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating a detector signals 57 including a read signal, a tracking error and a focusing error signal. The read apparatus is provided with tracking apparatus 51 coupled to the read head for receiving the tracking error signal from the read head and controlling the tracking actuator 59. During reading, the read signal is converted into output information, indicated by arrow 64, in the reading means 53, for example, including a channel decoder and an error corrector. The read apparatus is provided with an header detector 50 for detected the header areas and retrieving address information from the detector signals 57 when scanning the header areas of the tracks of the record carrier. The header detecting apparatus are arranged for reading the position information from the headers substantially at the data density, which substantially corresponds to the constant density used in CLV. The apparatus has positioning apparatus 54 for coarsely positioning the read head 52 in the radial direction on the track, the fine positioning being performed by the tracking apparatus 59. The device is further provided with a system control unit 56 for receiving commands from a controlling computer system or from a user and for controlling the apparatus via control lines 58, e.g. a system bus connected to the drive apparatus 55, the positioning apparatus 54, the header detector 50, the tracking apparatus 51 and the reading apparatus 53. To this end, the system control unit includes control circuitry, for example, a microprocessor, a program memory and control gates, for performing the procedures described below. The system control unit 56 may also be implemented as a state machine in logic circuits. It is to be noted, that the headers are located at CAV positions, and therefore the amount of data in the track portions is dependent on the radial position. The reading apparatus 53 are arranged for eliminating the headers from the data read, which eliminating may be controlled via the control lines 58 by the header detector 50. Alternatively, the reading apparatus are provided with deformatting apparatus, which recognize and remove the headers and further control information from the data stream.

The system control unit 56 is arranged to perform the position information recovery and positioning procedure as follows. A desired block address is derived from a command received from the user or from a controlling computer. The position of the block expressed in a track number and header number and distance from the header is calculated based on the known amounts of data stored in each track portion. A table may be used for a zoned format, giving for each zone the first block address and the length of the track portions, which is fixed during a zone. The radial distance from the current position to the desired track number is determined and a control signal is generated for positioning apparatus 54 to radially move the read head 52 to the desired track. When the radial movement is completed, a header is read by the header detector 50. The read signal of the header is processed to detect, if the desired track is being read. If so, the system control unit waits until the arrival of the desired header. After this header, any data before the calculated distance from the header is discarded, and data from the desired block is read from a linking position within the linking sector described with reference to FIG. 4c. In practice, all data starting at the header will be read, and any data before the start of the requested block will be discarded, and for reading the linking position is effectively equal to the start of the block.

Preferably, the system control unit 56 is arranged for combining the first amount of data from a first track portion with at least one further amount of data read from a consecutive track portion, the at least one further amount of data including a final amount of data retrieved from a track portion up to a next linking position. Hence, the total ECC block includes a first amount from part of the first track portion read, a final amount from part of the last track portion read, and intermediate amounts from track portions between the first and last track portion.

FIG. 6 shows a device for writing information on a record carrier, according to the invention, of a type which is (re)writable in, for example, a magneto-optical or optical manner (via phase change or dye) by using a beam 65 of electromagnetic radiation. The device is also equipped for reading and includes the same elements as the apparatus for reading described above with reference to FIG. 5, except that it has a write/read head 62. The write/read head 62 has the same function as the read head 52 together with a write function and is coupled to writing apparatus 60, which includes, for example, a formatter, an error coder, and a channel coder. The information presented to the input of the writing apparatus 60 (indicated by the arrow 63) is distributed over logical and physical sectors according to formatting and encoding rules and converted into a write signal 61 for the write/read head 62. The system control unit 56 is arranged for controlling the writing apparatus 60 and for performing the position information recovery and positioning procedure as described above for the reading apparatus. During the writing operation, marks representing the information are formed on the record carrier. Writing and reading of information for recording on optical discs and usable formatting, error correcting and channel coding rules, are well-known in the art, e.g. from the CD system. In particular, the header detecting means 50 are arranged for reading the position information from the headers substantially at the data density, which substantially corresponds to the constant density used in CLV. In the recording device or the reading device, the header detecting apparatus are synchronized to a data clock, which clock is generated by clock generation apparatus. The data clock is also used to control the writing apparatus 60 and/or the reading apparatus 53. The clock generation apparatus can be controlled by the system control unit 56 based on the radial position, the zone and the rotation rate of the disc. In an embodiment of the device, the clock generation apparatus include a phase locked loop, for example, accommodated in the header detection apparatus, which phase locked loop is locked to the periodic characteristics of the track, such as the wobble, during scanning. After a jump of the head 52,62 to a new scanning location, the clock generation apparatus may be preset to the data clock value at the new location, or the bandwidth of the phase locked loop may be increased to lock quickly to the new wobble frequency.

Figure 7:
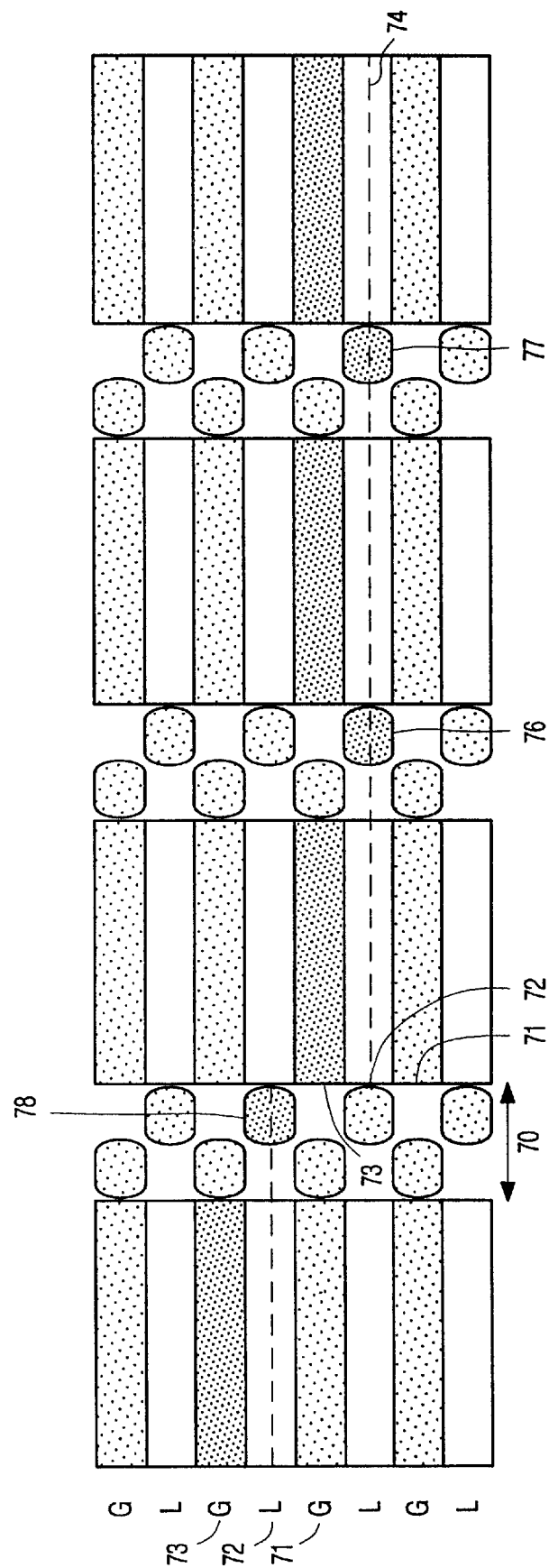
FIG. 7 shows a land/groove servo pattern at a zone boundary. Corresponding elements in different figures have identical reference numerals.

FIG. 7 shows a land/groove servo pattern at a zone boundary. The tracks marked L (land) and G (groove) are to be scanned from left to right and are connected via a spiral (not shown) to the left side of the figure. The tracks are provided with wobbles or other preformed variations indicating the track portion data storage density. A first groove track 71 is the last track of a first zone and has a wobble corresponding to the data density in that zone, the last part of the first groove track being shown on the left side of the figure. After the interruption by header area 70, the first groove track 71 continues as second groove track 73 belonging to the next zone, which is provided with the wobble according to that next zone, and hence, the intermediate land track 72 forms the zone boundary 74. From zone to zone the number of wobbles in a track portion may be increased, e.g. by 1 wobble or by a frame of 6 wobbles. In the land/groove format, the wobble is implemented in the groove, and on the land the wobbles of both neighbouring grooves are added in the servo signal. On the land 72 between two zones, there is in interference between the two wobbles of slightly different period, e.g. when the number of wobbles in a track portion is increased by one frame (6 wobbles) at a zone boundary, the servo signal will be extinct to zero six times. The advantage of having only one wobble increase per track portion at a zone boundary is, that only one extinction of the servo signal occurs. Having one or only a few extinctions in a boundary track portion gives a sufficiently long area before a header where the servo signal is present at a sufficient amplitude to keep the phase locked loop in lock. Hence, reading of the header is possible also at the boundary track portions and even recording data in such track portions is possible. Alternatively, the boundary track portions may be skipped, and even at least one header directly following a boundary turn. The servo signal of land track 72 has an interference of the two different wobbles and is not easily usable for data storage. Additional measures may be taken in the recording and reading device to counter the effects of the interference, but in a practical embodiment, the land track 72 is not used for data storage for a full turn, the unused turn forming the zone boundary 74. It is to be noted, that on the boundary 74 the first land header 76, the second land header 77, etc. up to the last land header 78, cannot be reliably read because of the interference. In an embodiment of the disc (for reliable operation) two additional headers are not used, resulting in an unused land track at eight headers in a turn. In an embodiment of the disc (for symmetry reasons, i.e. the same total storage capacity for land and groove), the capacity of the groove tracks is limited also by skipping the same amount of groove tracks at each zone boundary, shown in FIG. 7 as the groove track 73.

Although the invention has been explained by embodiments using four or eight headers in each turn, it will be clear that other numbers or a combination of numbers can be employed in the invention. For instance, a disc of a recordable type has been described, but the invention can be applied also to discs comprising recorded data, or discs of a read-only type. Further, the invention lies in each and every novel feature or combination of features.

What is claimed is:

1. An optical disc, comprising:
   a substrate; and
   a recording area on the substrate, for recording data at a substantially constant density, having circular or spiral tracks provided with a servopattern including headers alternating with track portions, the headers being radially aligned and comprising position information, the track portions being arranged for storing an amount of data substantially proportional to the radial position of the track portion concerned, and the position information being provided substantially at the constant density.

2. The optical disc of claim 1, in which the recording area is subdivided in a plurality of coaxial annular zones, each track portion within one of the zones for recording a same predetermined amount of data at a track portion density, the average of track portion densities within one zone being substantially equal to said constant density.

3. The optical disc of claim 2, in which the position information is provided at said track portion density.

4. Optical disc as claimed in claim 2, characterized in that a turn of the track comprises several headers, which headers within each one of the zones are radially aligned with corresponding headers in the radially outward adjoining zone.

5. The optical disc of claim 4, in which said turn comprises eight headers.

6. The optical disc of claim 1, in which the track potions comprise periodic characteristics indicative of the density for the respective track portion.

7. The optical disc of claim 6, in which the periodic characteristics comprise a radial track wobble.

8. The optical disc of claim 6, in which the periodic characteristics are radially aligned within each one of the zones.

9. The optical disc of claim 1, in which the data is subdivided in addressable blocks of a predetermined size, which size differs from the amount of data recordable in a track portion, and in that the position information comprises a block address indicative of the block locatable at the header and a next block indicator indicative of the distance from the header to the start of the next block.

10. The optical disc of claim 1, in which the position information comprises a track number indicative of the radial position of the track and header number indicative for the angular position of the header.

11. The optical disc of claim 1, in which the recording area comprises recorded data.

12. The optical disc of claim 11, in which the optical disc is of a read-only type.

13. Recording device comprising:

a recording head;

recording control means for recording data at a substantially constant density on an optical disc with a recording area having circular or spiral tracks provided with a servopattern including headers alternating with track portions, the headers being radially aligned and including position information, the track portions being arranged for recording an amount of data substantially proportional to the radial position of the track portion, and the position information being provided substantially at the constant density; and positioning means for positioning the recording head on a track at a position to be recorded, and including header detecting means for retrieving from the headers, the position information substantially at the constant density.

14. The recording device of claim 13, in which:

the recording area on the optical disc is subdivided in a plurality of coaxial annular zones;

the recording control means are arranged for recording in one of the track portions within one of the zones a same predetermined amount of data at a track portion density; and the average of track portion densities within one zone being substantially equal to said constant density.

15. The recording device of claim 13, in which, while the track portions comprise periodic characteristics indicative of the density for the respective track portion, the recording control means are arranged for controlling the speed of recording in dependence on the periodic characteristics.

16. The recording device of claim 13, in which the recording control means are arranged for recording the data subdivided in addressable blocks of a predetermined size, which size differs from the amount of data recordable in a track portion, and for starting said recording of one of the blocks at a linking position at a distance from the preceding header in dependence on the position information.

17. Reading device comprising:

a reading head;

reading control means for reading data from an optical disc recorded at a substantially constant density, the optical disc having a recording area with circular or spiral tracks provided with a servopattern including headers alternating with track portions, the headers being radially aligned and including position information, the track portions being arranged for recording an amount of data substantially proportional to the radial position of the track portion, and the position information being provided substantially at the constant density; and positioning means for positioning the reading head on a track at a position to be read, and including header detecting means for retrieving from the headers, and the position information substantially at the constant density.

18. The reading device of claim 17, in which the reading control means are arranged for retrieving the data in addressable blocks of a predetermined size, which size differs from the amount of data readable from a track portion, the retrieving of one of the blocks comprising retrieving a first amount of data starting at a linking position at a distance from the header preceding the track portion concerned, which track portion comprises a further amount of data belonging to a preceding block between the header and the linking position.

19. The reading device of claim 18, in which the retrieving comprises combining said first amount of data with at least one further amount of data read from a consecutive track portion, that at least one further amount of data comprising a final amount of data retrieved from a track portion up to a next linking position.

* * * * *